(12) United States Patent
Komatsuzaki

(10) Patent No.: US 10,803,303 B2
(45) Date of Patent: Oct. 13, 2020

(54) DETECTION APPARATUS AND NON-TRANSITORY COMPUTER READABLE MEDIUM

(71) Applicant: FUJI XEROX CO., LTD., Tokyo (JP)

(72) Inventor: Kazunari Komatsuzaki, Kanagawa (JP)

(73) Assignee: FUJI XEROX CO., LTD., Tokyo (JP)

( * ) Notice: Subject to any disclaimer, the term of this patent is extended or adjusted under 35 U.S.C. 154(b) by 87 days.

(21) Appl. No.: 16/166,183

(22) Filed: Oct. 22, 2018

(65) Prior Publication Data
US 2019/0236339 A1 Aug. 1, 2019

(30) Foreign Application Priority Data
Jan. 26, 2018 (JP) .................. 2018-011792

(51) Int. Cl.
*G06K 9/00* (2006.01)
*G01J 5/00* (2006.01)

(52) U.S. Cl.
CPC ........ *G06K 9/00302* (2013.01); *G01J 5/0025* (2013.01); *G06K 9/00255* (2013.01); *G06K 9/00275* (2013.01); *G06K 9/00281* (2013.01); *G01J 2005/0055* (2013.01); *G01J 2005/0077* (2013.01); *G01J 2005/0085* (2013.01)

(58) Field of Classification Search
CPC ....... G06T 7/521; G06T 17/05; G06T 7/2033; G06T 7/0012; A61B 5/165; A61B 5/0013; A61B 5/0022; G06K 19/06037; G06K 19/06028; G06K 19/0614; G06K 9/00302; G06K 9/00255; G06K 9/00275; G06K 9/00281; G01J 5/0025
USPC ........................ 382/103; 348/78, 208.14, 576
See application file for complete search history.

(56) References Cited

U.S. PATENT DOCUMENTS 9,501,704 B2    11/2016  Matsuo
2014/0313309 A1*  10/2014  Matsuo .................... A61B 5/01
                                                    348/78

FOREIGN PATENT DOCUMENTS

JP    2005237861    9/2005
JP    6110396       4/2017

* cited by examiner

*Primary Examiner* — Phuoc H Doan
(74) *Attorney, Agent, or Firm* — JCIPRNET

(57) ABSTRACT

A detection apparatus includes an acquisition unit and a detector. The acquisition unit acquires temperatures respectively corresponding to multiple parts of a subject identified from a visible image from a temperature image in which the temperatures of the parts of the subject are visualized. The detector detects a part not included in a temperature range preset for each of the parts, the part being included in the multiple parts of the subject whose temperatures are acquired by the acquisition unit.

11 Claims, 7 Drawing Sheets

WITHOUT EYEGLASSES

WITH EYEGLASSES

DETECTION APPARATUS AND NON-TRANSITORY COMPUTER READABLE MEDIUM

CROSS-REFERENCE TO RELATED APPLICATIONS

This application is based on and claims priority under 35 USC 119 from Japanese Patent Application No. 2018-011792 filed Jan. 26, 2018.

BACKGROUND

(i) Technical Field

The present disclosure relates to detection apparatuses and non-transitory computer readable media.

(ii) Related Art

Japanese Patent No. 6110396 discloses a drowsiness estimation device that performs drowsiness estimation by detecting a temperature parameter for estimating the drowsiness of a test subject. The drowsiness estimation device includes an acquisition unit that acquires visible-light image data by photographing the test subject in a wavelength range of visible light and body-surface-temperature distribution data by measuring the temperature distribution on the body surface of the test subject, an image processor that performs image processing on the visible-light image data so as to identify central eye regions of the test subject, and a correction unit that detects the temperatures of the central eye regions in the body-surface temperature distribution of the test subject indicated in the body-surface-temperature distribution data and that uses the temperatures of the central eye regions to correct the temperature parameter for estimating the drowsiness.

Japanese Unexamined Patent Application Publication No. 2005-237861 discloses an automatic temperature detection device including an imaging unit, an infrared detector, a measurement-subject setting unit that recognizes a measurement subject in accordance with image recognition from an image acquired by the imaging unit and that determines the position of a body-temperature measurement site in the measurement subject, a measurement-visual-field controller that controls a measurement visual field of the infrared detector such that the infrared detector detects infrared light radiated from the body-temperature measurement site, and a body-temperature calculator that calculates the body temperature of the measurement subject based on a detection value obtained by the infrared detector.

SUMMARY

A technology for measuring an emotion of a subject by measuring the temperature of the subject from a temperature image captured with an infrared camera has hitherto been developed.

However, parts of the subject the temperatures of which are desirably measured are not necessarily exposed. For example, the subject may be wearing objects that cover the body surface, such as a mask, eyeglasses, and a hat, or the face of the subject may be covered with hair.

Because an infrared camera measures the temperature of the subject by measuring the amount of infrared light radiated from the subject, the temperatures of the parts whose body surfaces are covered with objects may sometimes be measured with lower accuracy than the temperatures of parts whose body surfaces are not covered with objects.

Therefore, it is desirable that a body part covered with an object be detected from the temperature image and that the body temperature of the part be not used for measuring the emotion of the subject.

Aspects of non-limiting embodiments of the present disclosure relate to a detection apparatus and a detection program with which a part covered with an object is detectable from a temperature image.

Aspects of certain non-limiting embodiments of the present disclosure address the above advantages and/or other advantages not described above. However, aspects of the non-limiting embodiments are not required to address the advantages described above, and aspects of the non-limiting embodiments of the present disclosure may not address advantages described above.

According to an aspect of the present disclosure, there is provided a detection apparatus including an acquisition unit and a detector. The acquisition unit acquires temperatures respectively corresponding to multiple parts of a subject identified from a visible image from a temperature image in which the temperatures of the parts of the subject are visualized. The detector detects a part not included in a temperature range preset for each of the parts, the part being included in the multiple parts of the subject whose temperatures are acquired by the acquisition unit.

BRIEF DESCRIPTION OF THE DRAWINGS

Exemplary embodiments of the present disclosure will be described in detail based on the following figures, wherein.

DETAILED DESCRIPTION

Exemplary embodiments will be described below with reference to the drawings. Components and processes with identical functions will be given the same reference signs throughout the drawings, and redundant descriptions will be omitted.

First Exemplary Embodiment

Figure 1:
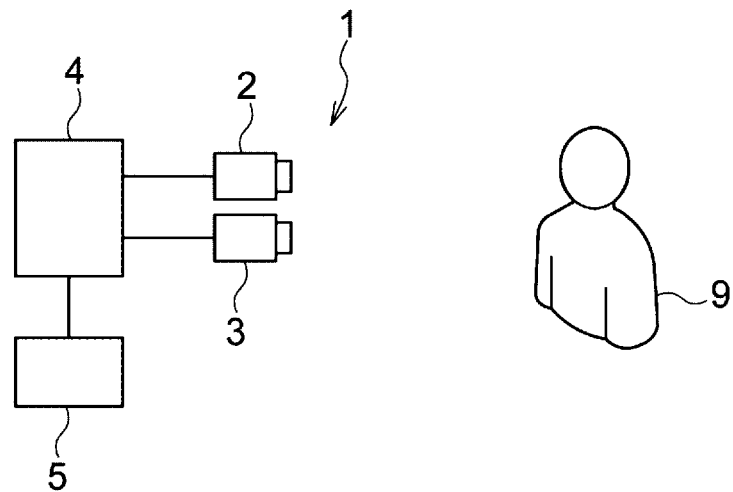
FIG. 1 illustrates a configuration example of a detection system according to a first exemplary embodiment.

FIG. 1 illustrates a configuration example of a detection system 1 according to a first exemplary embodiment. The detection system 1 detects human emotions. In addition to basic human emotions, such as delight, anger, sorrow, and pleasure, the term "emotions" include internal human states, such as anxiety, tension, stress, and bliss.

The detection system 1 shown in FIG. 1 includes, for example, a visible camera 2, an infrared camera 3, a detection apparatus 4, and a notifier 5.

The visible camera 2 is an example of an image capturing device that receives light having a wavelength included in a human visible range and generates an image from the intensity of the received light having the wavelength. The image captured by the visible camera 2 is referred to as "visible image 20" since the image is the same as a view as seen by a human.

The infrared camera 3 is an example of an image capturing device that receives infrared light radiated from an object, measures the temperature of the object from the intensity of the received infrared light, and converts the temperature of the object into a visible image by associating the measured temperature of the object with, for example, a color. The image captured by the infrared camera 3 is referred to as "temperature image 30" since the image expresses the temperature of the object.

The visible camera 2 and the infrared camera 3 are arranged such that the optical axes of the visible camera 2 and the infrared camera 3 are close to each other as much as possible and such that the distances from the visible camera 2 and the infrared camera 3 to a subject 9 are equal to each other. The optical axes extend through the centers of lenses of the visible camera 2 and the infrared camera 3 and are perpendicular to the lenses.

Furthermore, the zoom magnification of each of the visible camera 2 and the infrared camera 3 is set such that the field angles of the visible camera 2 and the infrared camera 3 are equal to each other. The field angles are ranges in which images are captured by the visible camera 2 and the infrared camera 3.

Specifically, the visible camera 2 and the infrared camera 3 are installed relative to the subject 9 such that, when the visible image 20 captured by the visible camera 2 and the temperature image 30 captured by the infrared camera 3 are superposed, the subject 9 included in the visible image 20 and the subject 9 included in the temperature image 30 are aligned with each other.

The detection apparatus 4 is connected to the visible camera 2 and the infrared camera 3, and acquires the visible image 20 and the temperature image 30 respectively from the visible camera 2 and the infrared camera 3. The detection apparatus 4 identifies parts of the subject 9 from the visible image 20 and acquires temperatures corresponding to the identified parts from the temperature image 30. The term "parts" refer to individual regions in a case where the subject 9 is divided into a plurality of regions. For example, if the subject 9 is a human, the forehead, the eyes, the nose, the cheeks, and the mouth correspond to the parts of the subject 9. Although the following description relates to a case where the subject 9 is a human, the subject 9 may alternatively be an animal.

With regard to the parts of the subject 9, a range of temperature that each part may have is preset for each part. For each of the parts, the detection apparatus 4 compares the corresponding preset temperature range with the temperature of the part, so as to detect a part not included in the corresponding temperature range.

Furthermore, the detection apparatus 4 estimates an emotion of the subject 9 by using the temperature of at least one part other than the part not included in the corresponding temperature range. Then, the detection apparatus 4 notifies the notifier 5 of the estimated emotion of the subject 9.

When the notifier 5 receives the emotion of the subject 9 from the detection apparatus 4, the notifier 5 provides a notification about the estimated emotion of the subject 9 to a user using the detection apparatus 4.

Although the visible camera 2 and the infrared camera 3 are individually connected to the detection apparatus 4 in the detection system 1 shown in FIG. 1, a so-called "dual camera" having an image capturing unit that captures the visible image 20 and an image capturing unit that captures the temperature image 30 within a single housing may be connected to the detection apparatus 4. In a dual camera, the arrangement of optical components including lenses is adjusted in advance so that the visible image 20 and the temperature image 30 to be obtained are identical to each other. Therefore, in a case where a dual camera is used, the time used for installing the detection system 1 may be reduced, as compared with a case where the visible camera 2 and the infrared camera 3 are individually connected to the detection apparatus 4.

Figure 2:
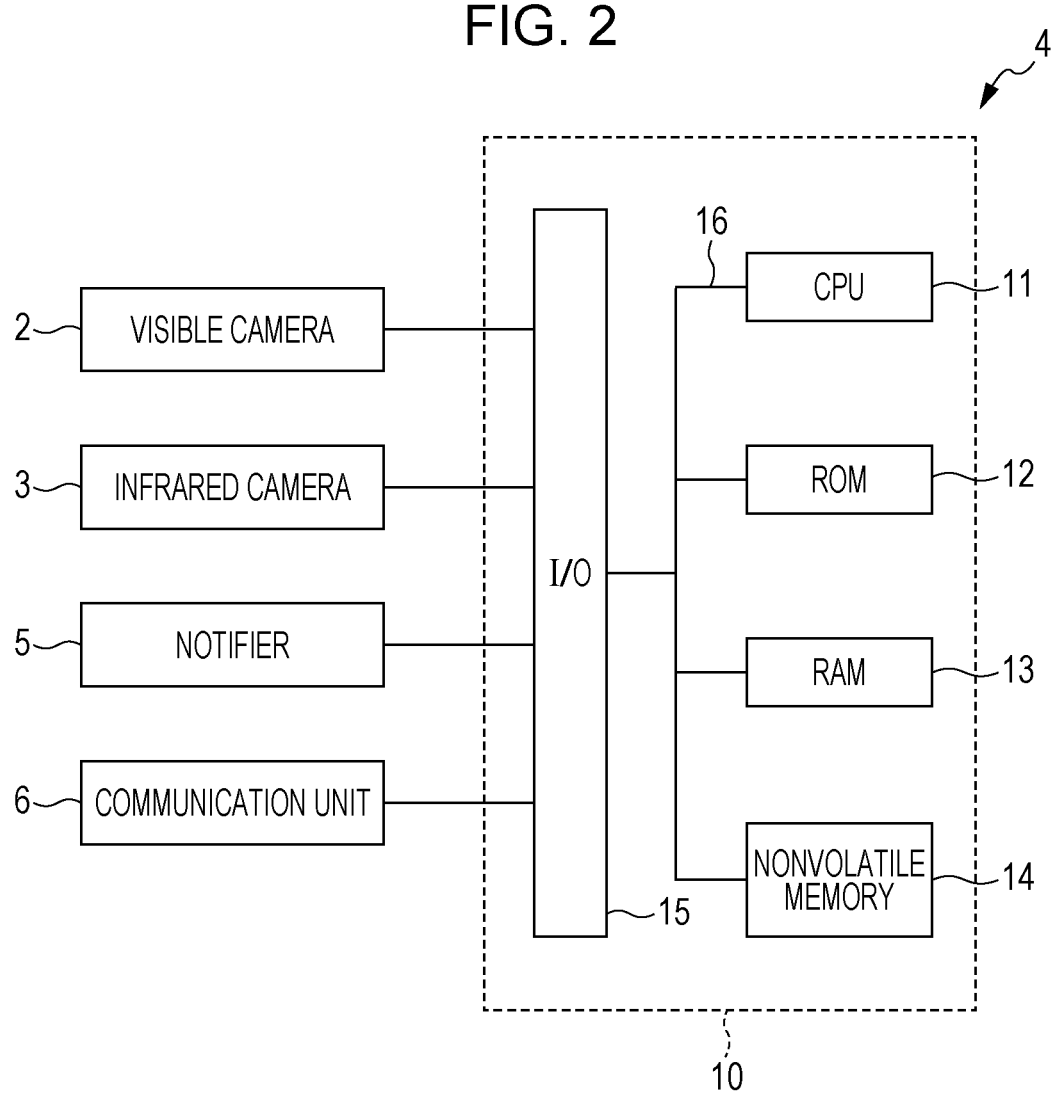
FIG. 2 illustrates a configuration example showing a relevant part of an electrical system in a detection apparatus according to the first exemplary embodiment.

The detection apparatus 4 of the detection system 1 described above is constituted by using, for example, a computer. FIG. 2 illustrates a configuration example showing a relevant part of an electrical system in the detection apparatus 4 constituted by using a computer 10.

The computer 10 includes a central processing unit (CPU) 11 functioning as an acquisition unit, a detector, and a notifier according to this exemplary embodiment, a read-only memory (ROM) 12, a random access memory (RAM) 13, a nonvolatile memory 14, and an input/output (I/O) interface 15. The CPU 11, the ROM 12, the RAM 13, the nonvolatile memory 14, and the I/O interface 15 are connected to one another via a bus 16. An operating system used in the computer 10 is not limited to a specific operating system.

The nonvolatile memory 14 is an example of a storage device that maintains information stored therein even when the electric power supplied to the nonvolatile memory 14 is cut off. Although a semiconductor memory is used as an example, a hard disk may be used as an alternative.

The I/O interface 15 is connected to, for example, the visible camera 2, the infrared camera 3, the notifier 5, and a communication unit 6.

The notifier 5 may be, for example, a liquid crystal display or an organic-electroluminescence or projector display device that provides a visual notification about information processed by the CPU 11 to the user using the detection apparatus 4. However, the notifier 5 is not limited to this example and may be of any type, such as a speaker or a printer, so long as the notifier 5 is configured to provide a notification about information processed by the CPU 11 to the user using the detection apparatus 4.

The communication unit 6 has a communication protocol that connects a communication line, such as the Internet, and the detection apparatus 4 and performs data communication between the detection apparatus 4 and another external device connected to the communication line. The communication unit 6 may be connected to the communication line in a wired or wireless manner.

In addition to the units shown in FIG. 2, the I/O interface 15 may be connected to another unit, such as an input unit that receives a command from the user and notifies the CPU 11 of the command. Examples of the input unit include a button, a touchscreen, a keyboard, and a mouse. The notifier 5 and the communication unit 6 do not necessarily have to be connected to the I/O interface 15.

Next, the operation of the detection apparatus 4 in the detection system 1 will be described with reference to FIG. 3.

Figure 3:
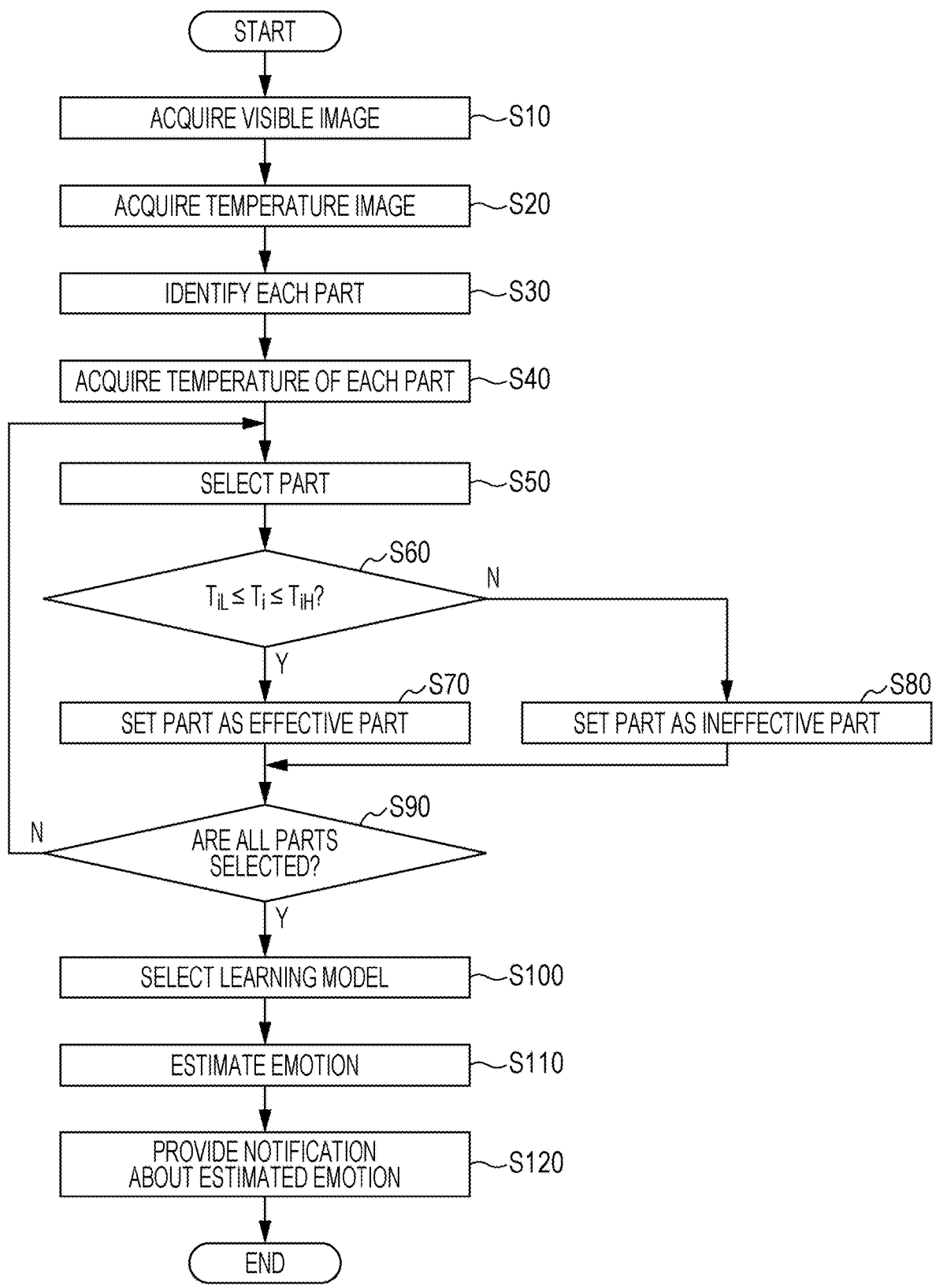
FIG. 3 is a flowchart illustrating an example of flow of a detection process according to the first exemplary embodiment.

FIG. 3 is a flowchart illustrating an example of flow of a detection process executed by the CPU 11 when the detection apparatus 4 receives, via, for example, the input unit (not shown), a command for starting the measurement of an emotion of the subject 9 from the user using detection apparatus 4.

A detection program that defines the detection process is stored in advance in, for example, the ROM 12 of the detection apparatus 4. The CPU 11 of the detection apparatus 4 reads the detection program stored in the ROM 12 so as to execute the detection process.

First, in step S10, the CPU 11 notifies the visible camera 2 of an image capture command for capturing the visible image 20, acquires the visible image 20 captured by the visible camera 2, and stores the visible image 20 in, for example, the RAM 13.

In step S20, the CPU 11 notifies the infrared camera 3 of an image capture command for capturing the temperature image 30, acquires the temperature image 30 captured by the infrared camera 3, and stores the temperature image 30 in, for example, the RAM 13.

The visible image 20 and the temperature image 30 respectively acquired from the visible camera 2 and the infrared camera 3 may be moving images or still images. In the following description, it is assumed that the visible image 20 and the temperature image 30 are still images. If the visible image 20 and the temperature image 30 are moving images, the CPU 11 notifies the visible camera 2 and the infrared camera 3 of the image capture commands such that the image-capture start timing is the same for the visible image 20 and the temperature image 30. Because a moving image is constituted of a plurality of still images (called "frame images"), frame images captured at the same time and included in the moving images respectively captured from the visible camera 2 and the infrared camera 3 may be treated as the visible image 20 and the temperature image 30.

In step S30, the CPU 11 identifies parts of the subject 9 by using the visible image 20 acquired in step S10. Specifically, the face of the subject 9 is recognized by using a known image analysis method, and a range estimated as the face of the subject 9 is set as a face region 22. Moreover, from the range including the set face region 22, the CPU 11 extracts characteristic facial points 24 indicating characteristic facial parts, such as the facial contour, eyebrows, eyes, nose, and mouth.

Figure 4A:
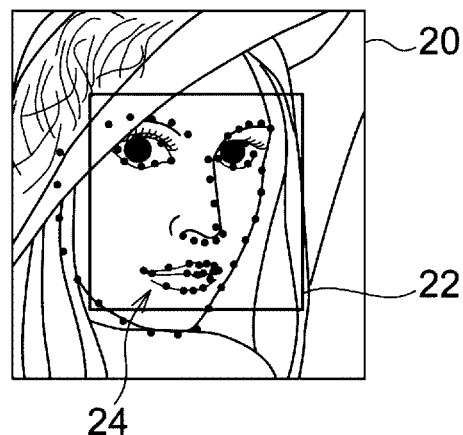
FIGS. 4A and 4B illustrate an example of a method for identifying parts of a subject.

FIG. 4A illustrates an example where the characteristic facial points 24 are extracted from the visible image 20 in step S30. Since the entire face of the subject 9 is not necessarily included in the set face region 22, the CPU 11 extracts the characteristic facial points 24 from a region obtained by expanding the face region 22 to a preset range.

The CPU 11 then identifies the positions of parts of the subject 9 in the visible image 20 from the layout of the extracted characteristic facial points 24.

Figure 4B:
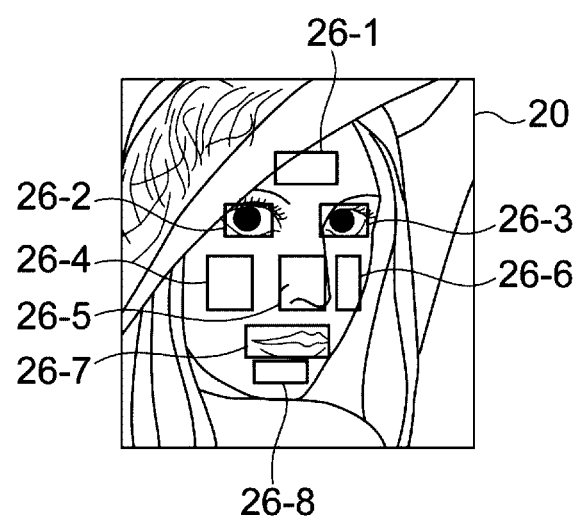

FIG. 4B illustrates an example of facial parts identified in step S30. In the example shown in FIG. 4B, a part 26-1 corresponding to the forehead, a part 26-2 corresponding to the right eye, a part 26-3 corresponding to the left eye, a part 26-4 corresponding to the right cheek, a part 26-5 corresponding to the nose, a part 26-6 corresponding to the left cheek, a part 26-7 corresponding to the mouth, and a part 26-8 corresponding to the chin are identified as facial parts. If it is not necessary to distinguish the facial parts from each other, the parts will collectively be referred to as "parts 26" hereinafter. For the sake of convenience, the part 26-1 to the part 26-8 may sometimes be referred to as "parts i" (i=26-1 to 26-8).

The facial parts 26 of the subject 9 identified by the CPU 11 are not limited to the part 26-1 to the part 26-8 shown in FIG. 4B, and may include other parts, such as eyebrows. Moreover, each of the parts 26 to be identified shown in FIG. 4B may be further segmented by, for example, dividing the part 26-5 corresponding to the nose into parts 26 corresponding to the nose wings, nose tip, and nose dorsum.

Because an emotion of the subject 9 tends to appear on the face, as compared with other parts of the body, an example where facial parts 26 are identified is described here. Alternatively, the CPU 11 may identify parts 26 of other parts of the body, such as the back of a hand.

The CPU 11 stores information indicating the range of each identified part 26 in, for example, the RAM 13. The information indicating the range of each part 26 uses, for example, coordinate values of a two-dimensional coordinate system expressed by two axes extending in the horizontal direction and the vertical direction of the visible image 20 from an upper left apex of the visible image 20 as an origin point. The coordinates are individually associated with the pixels of the visible image 20.

A two-dimensional coordinate system identical to that of the visible image 20 is also set for the temperature image 30, and the coordinates are individually associated with the pixels of the temperature image 30.

In step S40, the CPU 11 acquires the temperature of each part 26 of the subject 9 identified in step S30 from the temperature image 30 including the subject 9 acquired in step S20. Specifically, the CPU 11 acquires the information indicating the range of each part 26 of the subject 9 identified in step S30 from the RAM 13 and acquires the temperature in the range indicated by the information as the temperature of the corresponding part 26 from the temperature image 30.

If the temperatures of the pixels included in the part 26 are not the same, the temperature of the part 26 may be acquired by performing a predetermined statistical process such that, for example, an average value of the temperatures of the pixels is set as the temperature of the part 26.

In step S50, the CPU 11 selects one of unselected parts 26.

In step S60, the CPU 11 determines whether or not the temperature of the part 26 selected in step S50 is included in a temperature range preset for the selected part 26.

Although it is known that the temperature of each part 26 tends to change in accordance with an emotion of the subject 9, the fluctuation range of the body-surface temperature is limited since the subject 9 is a human. Thus, the temperature of each part 26 does not change unlimitedly. Therefore, the temperature of each part 26 has an upper limit value and a lower limit value.

The range of temperature that each part 26 may have is set in advance in accordance with, for example, actual testing of the detection system 1 or computer simulation based on design specifications of the detection system 1, and is stored in, for example, the nonvolatile memory 14. Therefore, the CPU 11 refers to the nonvolatile memory 14 so as to acquire the upper limit value and the lower limit value for the range of temperature that each part 26 may have.

Assuming that the temperature of the part 26 selected in step S50 is defined as $T_i$, the upper limit value for the range of temperature that the part 26 selected in step S50 may have is defined as $T_{iH}$, and the lower limit value for the range of temperature that the part 26 selected in step S50 may have is defined as $T_{iL}$, if $T_{iL} \leq T_i \leq T_{iH}$, it is determined that the part 26 selected in step S50 is included in the temperature range preset for each part 26, and the process proceeds to step S70.

In a case where the subject 9 wears an object that covers the body surface, such as a mask, eyeglasses, or a hat, or the face of the subject 9 is covered with hair, the temperature of the part 26 covered with the object is not properly measured with the infrared camera 3 since the body surface of the subject 9 is not exposed. In this case, the temperature of the part 26 covered with the object deviates from the temperature range preset for the part 26.

Figure 5A:
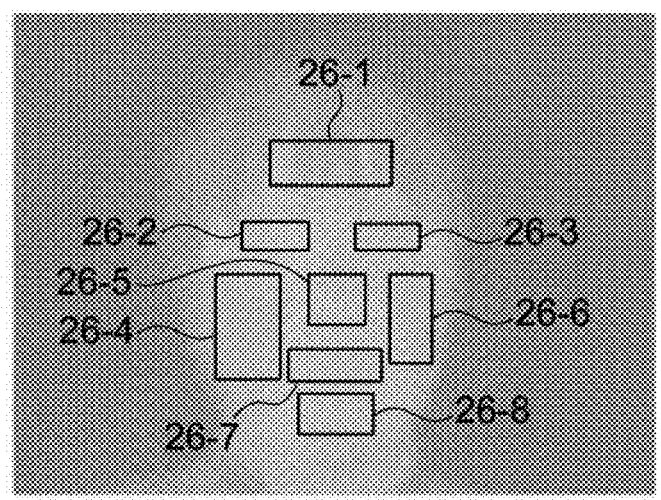
FIGS. 5A and 5B illustrate examples of temperature images of the subject.

Specifically, in a case where the part 26 selected in step S50 is included in the temperature range of the corresponding part 26, for example, it is conceivable that the selected part 26 is not covered with an object, as shown in FIG. 5A.

Therefore, the temperature of the part 26 selected in step S50 is the body-surface temperature of the subject 9 and serves as data effective for estimating an emotion of the subject 9. Thus, in step S70, the CPU 11 stores, in the RAM 13, the part 26 selected in step S50 as an effective part that may be used for estimating an emotion of the subject 9.

On the other hand, if it is determined in step S60 that the part 26 selected in step S50 is not included in the temperature range preset for each part 26, the process proceeds to step S80.

Figure 5B:
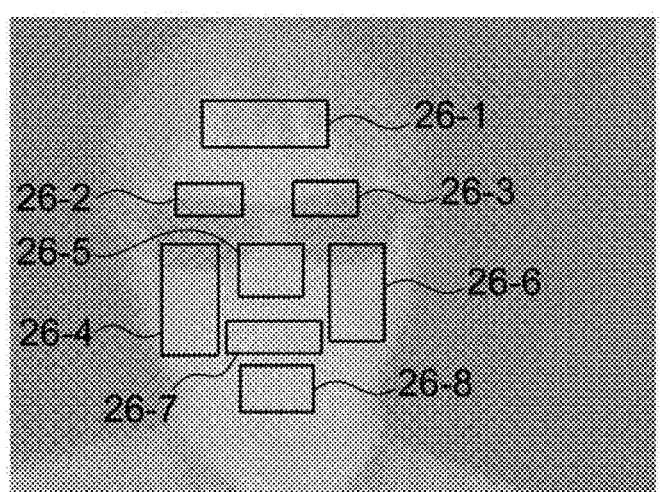

In this case, it is conceivable that the temperature of the part 26 selected in step S50 is the temperature of the object covering the body surface of the subject 9. FIG. 5B illustrates an example of the temperature image 30 having parts 26 not included in the preset temperature range. Because the subject 9 is wearing sunglasses in the example in FIG. 5B, the temperatures of the part 26-2 corresponding the right eye and the part 26-3 corresponding to the left eye are not included in the respective temperature ranges.

Accordingly, if a part 26 covered with an object is selected in step S50, the CPU 11 stores, in the RAM 13, the part 26 selected in step S50 as an ineffective part not to be used for estimating an emotion of the subject 9 in step S80.

In step S90, the CPU 11 determines whether or not all of the parts 26 identified in step S30 are selected in step S50. If there are unselected parts 26, the process proceeds to step S50 where the CPU 11 selects one of the unselected parts 26.

Subsequently, the process from step S50 to step S90 is repeated until all of the parts 26 identified in step S30 are selected in step S50, thereby classifying the parts 26 identified in step S30 into effective parts and ineffective parts.

In step S100, the CPU 11 uses at least one part 26 set as an effective part in step S70 to select a learning model for estimating an emotion of the subject 9.

A learning model to be used in the detection apparatus 4 is not limited and may be of any type so long as the learning model may be used for estimating an emotion of the subject 9 from the temperature of the part 26 of the subject 9. An example of a learning model that may be used is a neural network in which a bond strength that bonds neurons together by deep learning using the temperature of the part 26 as input data and an emotion as teaching data is learned. Another example of a learning model that may be used is an arithmetic expression expressing an emotion as a function of the temperature of the part 26.

In the nonvolatile memory 14 of the detection apparatus 4, a plurality of learning models used for estimating an emotion from the temperature of at least one of part 26 are stored in advance. The type of part 26 used for estimating an emotion varies from learning model to learning model. For example, one learning model may estimate an emotion using the part 26-1 corresponding to the forehead, the part 26-2 corresponding to the right eye, the part 26-3 corresponding to the left eye, the part 26-4 corresponding to the right cheek, the part 26-5 corresponding to the nose, the part 26-6 corresponding to the left cheek, the part 26-7 corresponding to the mouth, and the part 26-8 corresponding to the chin as input data, whereas another learning model may estimate an emotion using the part 26-5 corresponding to the nose as input data.

Therefore, the CPU 11 uses at least part 26 set as an effective part in step S70 to select a learning model for estimating an emotion of the subject 9 from the nonvolatile memory 14.

The location where the learning models are stored is not limited to the nonvolatile memory 14 of the detection apparatus 4. For example, the learning models may be stored in another external device connected to the communication line, and the CPU 11 may acquire a learning model from the external device via the communication unit 6.

In step S110, the CPU 11 estimates an emotion of the subject 9 in accordance with an output of a learning model obtained when the temperature of the part 26 set as an input of the learning model selected in step S100 is input to the learning model.

In step S120, the CPU 11 controls the notifier 5 so as to notify the user using the detection apparatus 4 of the emotion estimated in step S110.

Accordingly, the detection process shown in FIG. 3 ends.

In step S60 of the detection process shown in FIG. 3, it is determined whether or not the selected part 26 is a part 26 included in the temperature range preset for each part 26, and a part 26 other than the part 26 detected as being included in the temperature range is detected as a part 26 not included in the temperature range. In contrast, the CPU 11 may determine in step S60 whether or not the selected part 26 is a part 26 not included in the temperature range preset for each part 26, so as to detect the part 26 not included in the temperature range. A part 26 of the subject 9 not included in the temperature range is detected by the detection apparatus 4 using either one of the determination methods.

Accordingly, in the detection apparatus 4 according to the first exemplary embodiment, the temperature of each part 26 of the subject 9 identified using the visible image 20 is acquired from the temperature image 30, and the temperature of the part 26 is compared with the temperature range associated with the part 26, so that it is detected whether or not the part 26 of interest is a part 26 covered with an object.

Furthermore, the detection apparatus 4 selects a learning model for estimating an emotion of the subject 9 from a plurality of learning models by using the temperature of a part 26 other than the part 26 covered with the object, that is, the temperature of at least part 26 not covered with the object, as input data, and estimates an emotion of the subject 9 by inputting the temperature of the at least one part 26 not covered with the object to the selected learning model.

Modification of First Exemplary Embodiment

In the above exemplary embodiment, a learning model for estimating an emotion of the subject 9 is selected from a plurality of learning models by using at least one part 26 of parts 26 set as effective parts. However, there may be a case where a learning model for estimating an emotion of the subject 9 from the temperature of a part 26 set as an effective part does not exist in the plurality of learning models prepared in advance.

For example, in a situation where all of the learning models use the temperature of the forehead of the subject 9, if the forehead of the subject 9 is covered with hair and is set as an ineffective area, there would be no learning models to select from in this state.

In such a case, the detection apparatus 4 may use the temperature of an effective part 26 that is to be used in a learning model and that is adjacent to a part 26 (referred to as "insufficient part" hereinafter) set as an ineffective part as an alternative to the temperature of the insufficient part, and may input the temperature to the learning model. Because the effective part adjacent to the insufficient part is closer in distance from the insufficient part than other effective parts, the temperature of the effective part adjacent to the insufficient part often has a value closer to the temperature of the insufficient part than the temperatures of other effective parts. Therefore, by inputting the temperature of the effective part adjacent to the insufficient part to the learning model in place of the temperature of the insufficient part, an emotion of the subject 9 is estimated.

Specifically, if the forehead is set as an ineffective part in a situation where the temperature of the forehead is necessary in the learning model, an emotion of the subject 9 may be estimated by inputting the temperature of an effective part adjacent to the forehead, such as the temperature of the part 26-2 corresponding to the right eye or the part 26-3 corresponding to the left eye, as the temperature of the forehead to the learning model.

As another alternative, the detection apparatus 4 may estimate the temperature of the insufficient part in the learning model from the temperature of an effective part adjacent to the insufficient part. Specifically, the temperature of the insufficient part may be estimated by using the temperature of the effective part adjacent to the insufficient part.

For example, if the forehead is set as an ineffective part in a situation where the temperature of the forehead is necessary in the learning model, the detection apparatus 4 estimates the temperature of the forehead by performing a known interpolation method, such as a least squares method, using the temperatures of the part 26-2 corresponding to the right eye and the part 26-3 corresponding to the left eye, which are effective parts adjacent to the forehead.

Consequently, by inputting the temperature of the insufficient part estimated from the temperature of an adjacent effective part, an emotion of the subject 9 is estimated.

Because the temperature of the insufficient part estimated from the temperature of the adjacent effective part is not directly obtained from the temperature image 30, the reliability with respect to the accuracy of the temperature may be lower than that of the temperature of an effective part directly obtained from the temperature image 30.

Therefore, when a learning model for estimating an emotion of the subject 9 using the temperature of an insufficient part estimated from the temperature of an adjacent effective part and the temperature of the effective part is selected, the detection apparatus 4 adjusts the learning model such that the degree of contribution, that is, the weight, of the estimated temperature of the insufficient part to the estimation of an emotion of the subject 9 is lower than the weight of the temperature of the effective part.

Figure 6:
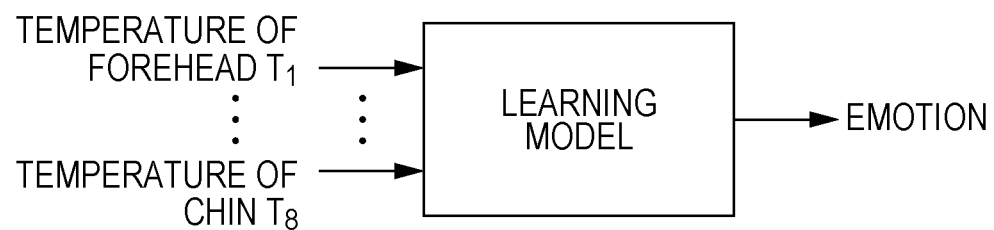
FIG. 6 illustrates an example of a method for estimating an emotion.

As shown in FIG. 6, in a case where the detection apparatus 4 selects a learning model, if a temperature $T_1$ of the forehead is the temperature estimated from the temperature of an adjacent effective part among the temperatures of parts 26 input to the selected learning model, and if the temperatures of other parts 26 are directly obtained from the temperature image 30 in step S40 in FIG. 3, the detection apparatus 4 adjusts the selected learning model such that the weight to be applied by the temperature $T_1$ of the forehead to the estimation of an emotion is lower than the weight to be applied by the temperatures of other parts 26 to the estimation of an emotion.

For example, if the learning model is indicated in accordance with a neural network, a bond strength between an input neuron, to which the temperature estimated from the temperature of an adjacent effective part is input, and another neuron to be connected to the input neuron is adjusted to a low level based on a pre-learned value, so that the weight to be applied by the temperature estimated from the temperature of the adjacent effective part to the estimation of an emotion is adjusted to be lower than the weight to be applied by the temperature of another part 26 to the estimation of an emotion.

Second Exemplary Embodiment

The temperature of the subject 9 tends to change in accordance with the air temperature of the space in which the subject 9 is located. On the other hand, the temperature range preset for each part 26 is a temperature range set at a predetermined air temperature (referred to as "reference temperature" hereinafter). Therefore, as the difference between the reference temperature and the air temperature during a period in which the temperature of the subject 9 is measured with the infrared camera 3 increases, a part 26 not covered with an object may undesirably be detected as an ineffective part, or a part 26 covered with an object may undesirably be detected as an effective part.

In the second exemplary embodiment, a detection system 1A that corrects the temperature range preset for each part 26 in accordance the air temperature of the space in which the subject 9 is located will be described.

Figure 7:
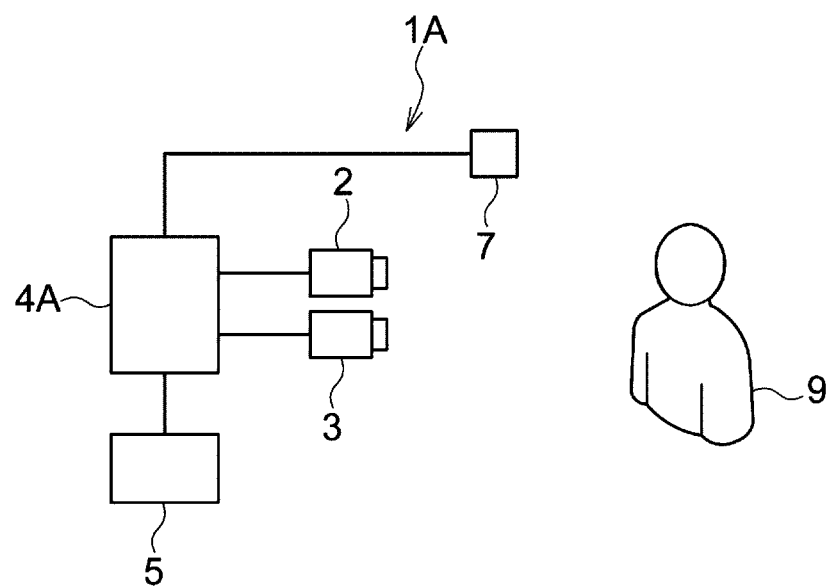
FIG. 7 illustrates a configuration example of a detection system according to a second exemplary embodiment.

FIG. 7 illustrates a configuration example of the detection system 1A according to the second exemplary embodiment. The detection system 1A shown in FIG. 7 differs from the detection system 1 shown in FIG. 1 in that the detection apparatus 4 is replaced with a detection apparatus 4A and in that the detection apparatus 4A is connected to a thermometer 7. The remaining components are the same as those in the detection system 1.

The thermometer 7 is installed in the same space as the space in which the subject 9 is located. For example, if the subject 9 is located within a room, the thermometer 7 is installed in a room in which the subject 9 is located. Accordingly, the air temperature of the space in which the subject 9 is located is measured by the thermometer 7.

Figure 8:
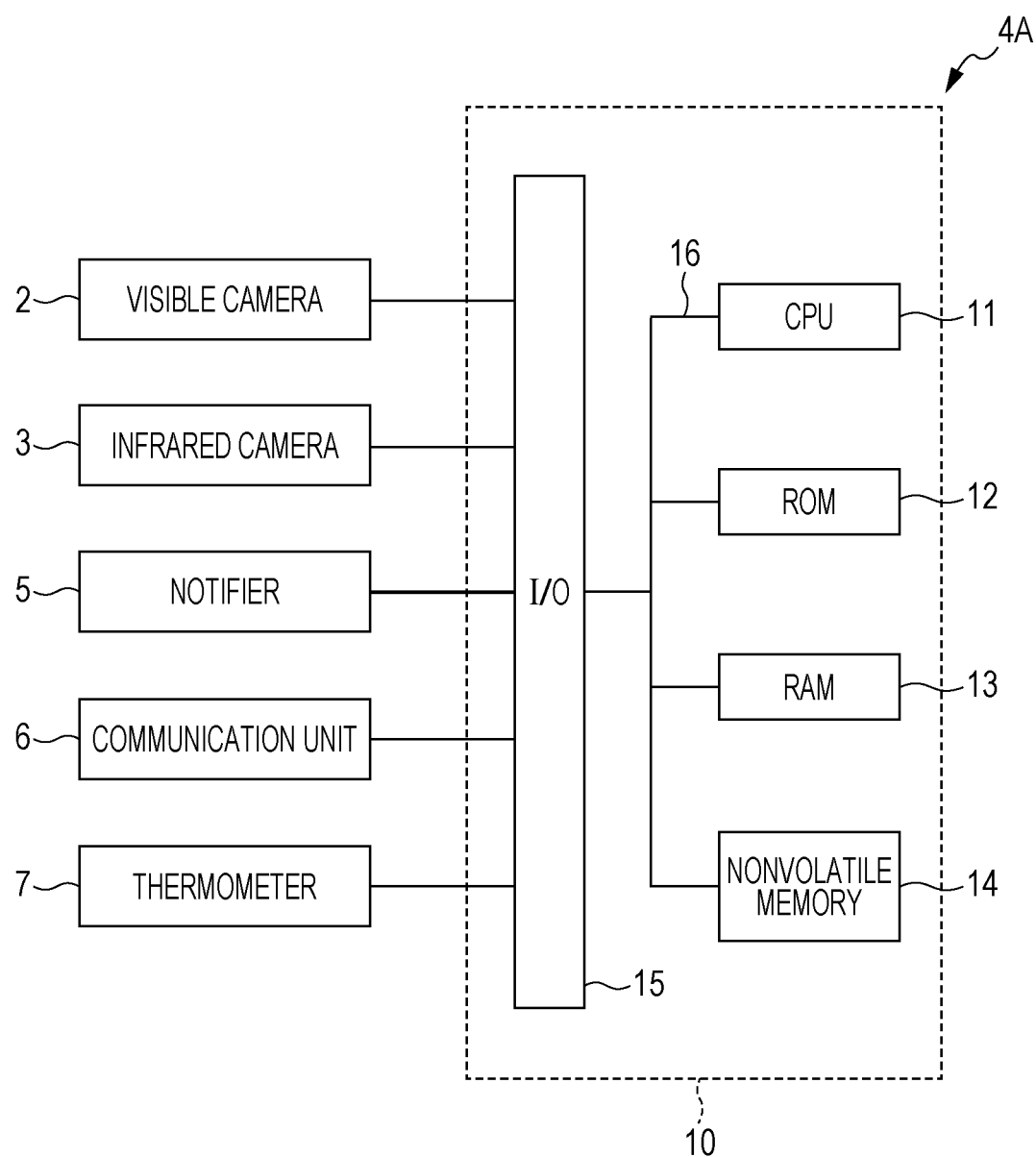
FIG. 8 illustrates a configuration example showing a relevant part of an electrical system in a detection apparatus according to the second exemplary embodiment.

The detection apparatus 4A of the detection system 1A described above is similar to the detection apparatus 4 according to the first exemplary embodiment in being constituted by using, for example, a computer. FIG. 8 illustrates a configuration example showing a relevant part of an electrical system in the detection apparatus 4A constituted by using the computer 10.

The CPU 11 according to this exemplary embodiment functions as an acquisition unit, a detector, a correction unit, and a notifier.

The configuration example of the detection apparatus 4A shown in FIG. 8 differs from the configuration example of the detection apparatus 4 shown in FIG. 2 in that the I/O interface 15 is connected to the thermometer 7. The remaining components are the same as those in the detection apparatus 4. Accordingly, the CPU 11 acquires the air temperature measured by the thermometer 7. As already mentioned above with reference to FIG. 2, the I/O interface 15 may be connected to other units, such as an input unit, in addition to the units shown in FIG. 8. Moreover, the notifier 5 and the communication unit 6 do not necessarily have to be connected to the I/O interface 15.

The operation of the detection apparatus 4A in the detection system 1A will now be described with reference to FIG. 9.

Figure 9:
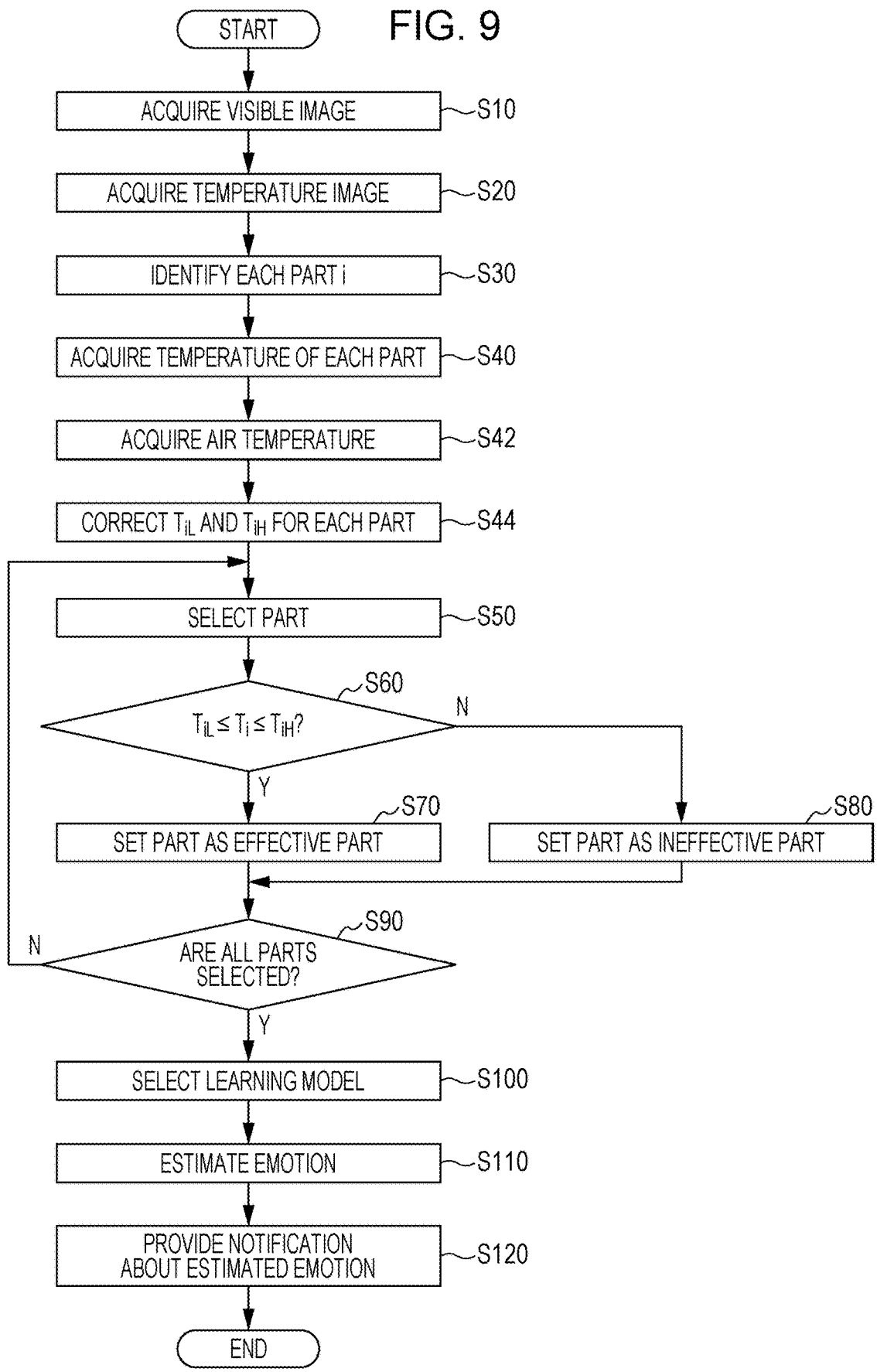
FIG. 9 is a flowchart illustrating an example of flow of a detection process according to the second exemplary embodiment.

FIG. 9 is a flowchart illustrating an example of flow of a detection process executed by the CPU 11 when the detection apparatus 4A receives, via, for example, the input unit (not shown), a command for starting the measurement of an emotion of a subject 9 from a user using the detection apparatus 4A.

A detection program that defines the detection process is stored in advance in, for example, the ROM 12 of the detection apparatus 4A. The CPU 11 of the detection apparatus 4A reads the detection program stored in the ROM 12 so as to execute the detection process.

The flowchart shown in FIG. 9 is different from the flowchart of the detection process performed by the detection apparatus 4 shown in FIG. 3 in that step S42 and step S44 are added between step S40 and step S50. Other steps are the same as those in the detection process performed by the detection apparatus 4.

In the detection process shown in FIG. 9, step S42 is executed after the temperatures of the parts 26 of the subject 9 are acquired in step S40.

In step S42, the CPU 11 acquires, from the thermometer 7, the air temperature of the space in which the subject 9 is located.

In step S44, the CPU 11 acquires the temperature range preset for each part 26 from the nonvolatile memory 14 and corrects each acquired temperature range in accordance with the air temperature acquired in step S42.

For example, because the temperature of each part 26 tends to increase as the air temperature acquired in step S42 increases from the reference temperature, the CPU 11 corrects the temperature range corresponding to each part 26 so as to raise the lower limit value and the upper limit value for the temperature range corresponding to each part 26.

Furthermore, because the temperature of each part 26 tends to decrease as the air temperature acquired in step S42 decreases from the reference temperature, the CPU 11 corrects the temperature range corresponding to each part 26 so as to lower the lower limit value and the upper limit value for the temperature range corresponding to each part 26.

In this case, the CPU 11 may uniformly set the correction amounts for the temperature ranges corresponding to the respective parts 26 in accordance with the difference between the acquired air temperature and the reference temperature, or may vary the correction amount for each part 26.

In step S60, the temperature range for each part 26 corrected in accordance with the air temperature in step S44 is compared with the temperature of the part 26 selected in step S50 so as to determine whether or not the temperature of the part 26 selected in step S50 is included in the corrected temperature range of the selected part 26. The subsequent steps have already been described in the detection process in FIG. 3.

An environmental attribute that affects the temperature of the subject 9 is not limited to the air temperature. The temperature of the subject 9 also tends to change in accordance with humidity. For example, even at the same air temperature, sweat is less likely to evaporate at higher humidity levels, thus causing the temperature of the subject 9 to increase. Thus, a hygrometer may be connected to the detection apparatus 4A so as to acquire the humidity of the space in which the subject 9 is located. The temperature range corrected in accordance with the air temperature may be further corrected in accordance with a difference between a preset humidity (also referred to as "reference humidity") used when presetting the temperature range of each part 26 and the humidity acquired from the hygrometer.

Accordingly, the detection apparatus 4A corrects the temperature range preset for each part 26 in accordance with the air temperature and detects whether or not the part 26 of interest is a part 26 covered with an object.

Furthermore, the detection apparatus 4A selects a learning model for estimating an emotion of the subject 9 from a plurality of learning models by using the temperature of a part 26 other than a part 26 covered with an object, that is, the temperature of at least one part 26 not covered with an object, as input data, and estimates an emotion of the subject 9 by inputting the temperature of the at least one part 26 not covered with the object to the selected learning model.

Needless to say, an emotion of the subject 9 may be estimated by applying the method described in the modification of the first exemplary embodiment to the detection process in FIG. 9.

Although the present disclosure has been described above with reference to the exemplary embodiments, the present disclosure is not limited to the scope defined in each of the exemplary embodiments. Various modifications and alterations to each exemplary embodiment are permissible within the scope of the present disclosure, and a modified or altered exemplary embodiment is included in the technical scope of the present disclosure. For example, the sequence of the steps may be changed so long as it does not depart from the scope of the present disclosure.

Each of the exemplary embodiments relates to an example where images of a person are captured using the visible camera 2 and the infrared camera 3 so as to detect a part covered with an object and also to detect an emotion of the person. However, the subject 9 of each of the detection system 1 and 1A described above is not limited to a biological organism, such as a human. Images of a subject 9 different from a biological organism may be captured using the visible camera 2 and the infrared camera 3 so as to detect a part of the subject 9 covered with an object.

For example, in a molding process of heating and shaping a steel material, if the surface of the steel material has an impurity adhered thereto, the temperature of a part covered with the impurity may decrease relative to the temperature of a part not covered with the impurity. Therefore, by capturing images of the heated steel material by using the visible camera 2 and the infrared camera 3, parts 26 of the steel material may be identified from the visible image 20, and a part 26 not included in a preset range of temperature that the part 26 may have when the surface of the steel material is not covered with the impurity may be detected. Consequently, a position where the impurity is adhered to the steel material is identified. In a case where an object other than a biological organism is set as a subject, it is not necessary to execute step S100 to step S120 in FIGS. 3 and 9 since the subject has no emotions.

Furthermore, although each of the exemplary embodiments relates to an example where the detection process is realized by software, a process equivalent to each of the flowcharts shown in FIGS. 3 and 9 may be implemented in, for example, an application specific integrated circuit (ASIC) and be processed by hardware. In this case, the detection process may be increased in speed.

Furthermore, as an alternative to each of the exemplary embodiments described above in which the detection program is installed in the ROM 12, the detection program according to each of the exemplary embodiments of the present disclosure may be provided by being recorded in a computer readable storage medium. For example, the detection program according to each of the exemplary embodiments of the present disclosure may be provided by being recorded in an optical disk, such as a compact disc read-only memory (CD-ROM) or a digital versatile disc read-only memory (DVD-ROM). Moreover, the detection program according to each of the exemplary embodiments of the present disclosure may be provided by being recorded in a semiconductor memory, such as a universal serial bus (USB) memory or a flash memory. Furthermore, each of the detection apparatuses 4 and 4A may acquire the detection program according to each of the exemplary embodiments of the present disclosure from an external device connected to the communication line, such as the Internet, via the communication line.

The foregoing description of the exemplary embodiments of the present disclosure has been provided for the purposes of illustration and description. It is not intended to be exhaustive or to limit the disclosure to the precise forms disclosed. Obviously, many modifications and variations will be apparent to practitioners skilled in the art. The embodiments were chosen and described in order to best explain the principles of the disclosure and its practical applications, thereby enabling others skilled in the art to understand the disclosure for various embodiments and with the various modifications as are suited to the particular use contemplated. It is intended that the scope of the disclosure be defined by the following claims and their equivalents.

What is claimed is:

1. A detection apparatus comprising:
   an acquisition unit that acquires temperatures respectively corresponding to a plurality of parts of a subject identified from a visible image from a temperature image in which the temperatures of the parts of the subject are visualized; and
   a detector that detects a part not included in a temperature range preset for each of the parts, the part being included in the plurality of parts of the subject whose temperatures are acquired by the acquisition unit,
   wherein the temperature range preset for each of the plurality of parts has an upper limit value and a lower limit value.

2. The detection apparatus according to claim 1, further comprising:
   a notifier that provides a notification about an emotion of the subject estimated from the temperature of at least one of the parts of the subject acquired by the acquisition unit.

3. The detection apparatus according to claim 2,
   wherein the notification about the emotion of the subject provided by the notifier is estimated by using the temperature of a part other than the part that is not included in the temperature range and that is detected by the detector, the parts being included in the plurality of parts of the subject whose temperatures are acquired by the acquisition unit.

4. The detection apparatus according to claim 3,
   wherein the notification about the emotion of the subject provided by the notifier is estimated by using the temperature of a part adjacent to the part that is not included in the temperature range and that is detected by the detector.

5. The detection apparatus according to claim 2,
   wherein the notification about the emotion of the subject provided by the notifier is estimated by using the temperature of the part not included in the temperature range after an interpolation, the interpolation being performed by using the temperature of a part adjacent to the part that is not included in the temperature range and that is detected by the detector.

6. The detection apparatus according to claim 5,
   wherein the notification about the emotion of the subject provided by the notifier is estimated such that the temperature of a temperature-interpolated part is given a lower weight related to estimation of the emotion of the subject than the temperature of a part whose temperature is included in the temperature range.

7. The detection apparatus according to claim 1, further comprising:
   a correction unit that corrects the temperature range for each part in accordance with an air temperature,
   wherein the detector detects the part not included in the temperature range by using the temperature range corrected by the correction unit.

8. The detection apparatus according to claim 7,
   wherein the correction unit corrects the temperature range so as to raise a lower limit value and an upper limit value for the temperature range as the air temperature increases.

9. The detection apparatus according to claim 7,
   wherein the correction unit corrects the temperature range so as to lower a lower limit value and an upper limit value for the temperature range as the air temperature decreases.

10. A detection apparatus comprising:
    an acquisition unit that acquires temperatures respectively corresponding to a plurality of parts of a subject identified from a visible image from a temperature image in which the temperatures of the parts of the subject are visualized; and
    a detector that detects a part included in a temperature range preset for each of the parts and that further detects a part other than the detected part as a part not included in the temperature range, the detected parts being included in the plurality of parts of the subject whose temperatures are acquired by the acquisition unit,
    wherein the temperature range preset for each of the plurality of parts has an upper limit value and a lower limit value.

11. A non-transitory computer readable medium storing a program causing a computer to execute a detection process, the detection process comprising:
    acquiring temperatures respectively corresponding to a plurality of parts of a subject identified from a visible image from a temperature image in which the temperatures of the parts of the subject are visualized; and
    detecting a part not included in a temperature range preset for each of the parts, the part being included in the plurality of parts of the subject whose temperatures have been acquired,
    wherein the temperature range preset for each of the plurality of parts has an upper limit value and a lower limit value.

* * * * *